United States Patent [19]

Hart

[11] Patent Number: 4,681,546

[45] Date of Patent: Jul. 21, 1987

[54] PERSONAL COLOR ANALYSIS METHOD

[76] Inventor: Charlavan Hart, 325 E. Pipeline, Bedford, Tex. 76021

[21] Appl. No.: 632,944

[22] Filed: Jul. 20, 1984

[51] Int. Cl.$^4$ ............................................. G09B 19/00
[52] U.S. Cl. ...................................... 434/99; 434/102; 356/419
[58] Field of Search ...................... 434/94, 98, 99, 100, 434/101, 102, 371; 356/416, 419

[56] References Cited

U.S. PATENT DOCUMENTS

| | | | |
|---|---|---|---|
| 2,317,673 | 4/1943 | Craig | 434/98 |
| 2,499,450 | 3/1950 | Bergman | 434/99 |
| 3,314,167 | 4/1967 | Allgood | 434/102 |
| 4,351,591 | 9/1982 | Stockett | 434/100 X |
| 4,561,850 | 12/1985 | Fabbri | 434/98 |

*Primary Examiner*—William H. Grieb
*Attorney, Agent, or Firm*—Plante Strauss & Vanderburgh

[57] ABSTRACT

There is disclosed a method and apparatus for use in the method, for selecting and coordinating the color of a person's wardrobe and accessories to flatter and complement the person. The method includes a color spectrum analysis of the natural tones of the person's skin, preferably by use of a color filter system. The color spectrum analysis is performed to determine the distribution and concentration of at least one, and preferably, two, primary colors. Wearing apparel and accessory items are categorized into classes based on the concentration of the preselected color in these items and the classes most closely matching the proportions of the selected primary color found in the skin tones of the person are selected for that person's wardrobe and accessories. The method uses a set of color filters with coded indicia that provide a facile manner in determining the distribution and concentration of the selected primary color.

16 Claims, 1 Drawing Figure

U.S. Patent  Jul. 21, 1987  4,681,546
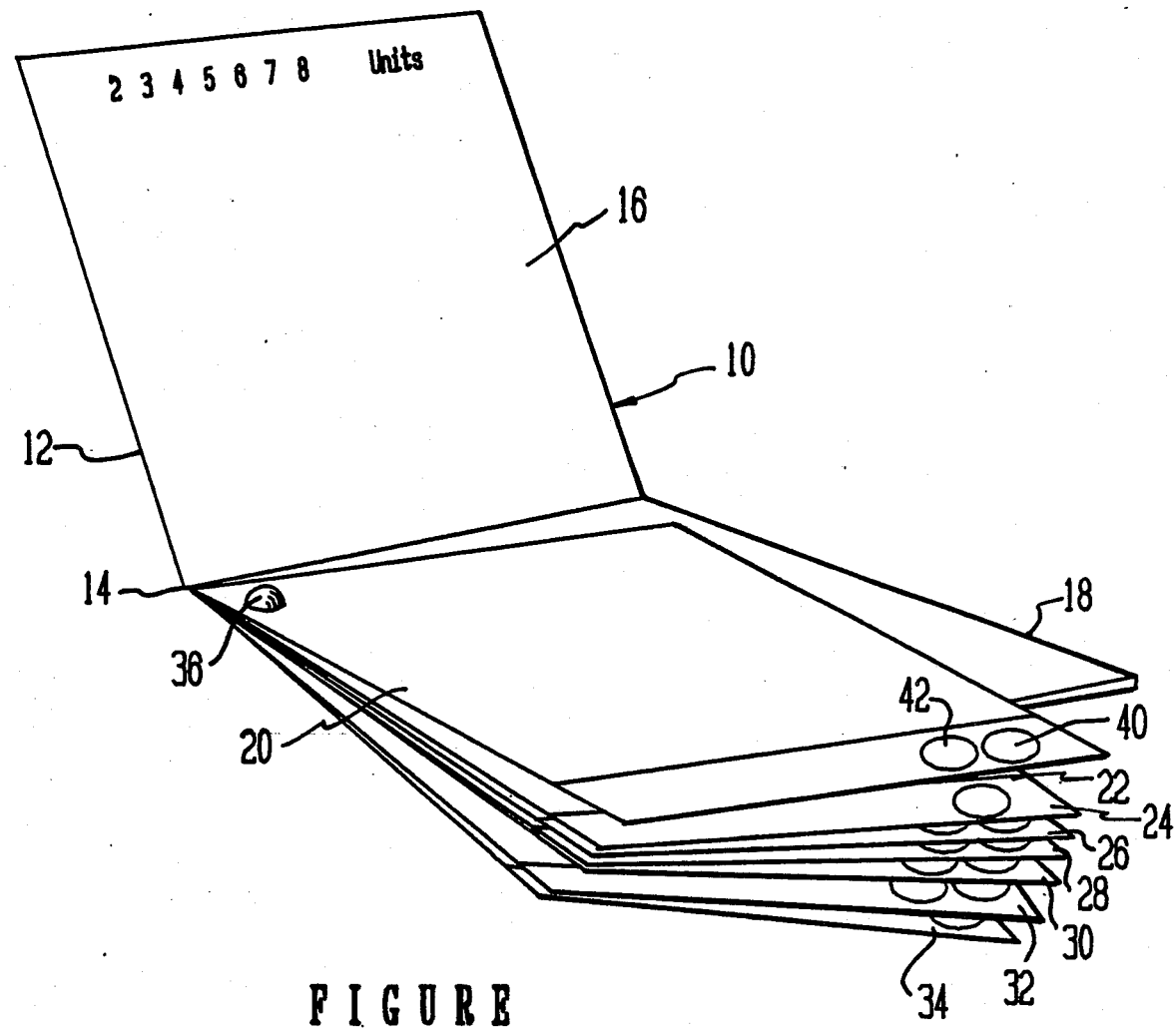
FIGURE

PERSONAL COLOR ANALYSIS METHOD

BACKGROUND OF THE INVENTION

1. Field of the Invention

This invention relates to a system for color matching of wearing apparel and accessories to skin color tones and in particular, to a simplified method for color spectrum analysis.

2. Brief Statement of the Prior Art

Consumers have commonly purchased items such as wearing apparel and accessories using a subjective selection of the colors which look best in a fitting room. The shortcomings of this subjective color selection has been recognized and some attempts have been made to match the items to the individual's skin tones. These attempts have used paint chips or colored scarves which are placed next to the individual's skin and the selected chip or scarf is then used to select wearing apparel. This approach has, nevertheless, remained subjective as it relies upon a color specialist's judgment to determine which of the colored fabrics or paint chips most closely approximates the color of the individual's skin. This subjective selection is very unscientific and consistent results are not achieved since it is very easy to identify the color of skin incorrectly. The skin can often appear shallow or ruddy due to conditions having nothing to do with its true color. Furthermore, the prior approaches have generally only categorized skin between cool natured which looks pink, blue or white and warm natured which appears peach or golden. There has not been recognition of a cross-over coloration in the skin tones and this is a significant failing in the prior art. The colors most effected by the skin color are shades of red, yellow, pink, purple and white. If these colors are altered with blue, they usually flatter the "cool" skin. If they are altered with yellow, they flatter "warm" skin. But if they are altered with black and/or white, they flatter the "cross-over" type of skin.

BRIEF STATEMENT OF THE INVENTION

This invention utilizes a scientific coordination of colors of wearing apparel and accessories for individuals and uses a color spectrum analysis to determine the proportion of one or two preselected primary colors in the natural tones of an individual's skin, and the use of the information obtained by the color spectrum analysis for the selection of the proper colors of wearing apparel and accessories. The preferred system employs a series of colored filters which have identifying indicia to permit the determination of the concentration of at least one, and, preferably, two, of the primary colors in the natural skin tones of the individual. Preferably blue is employed as the preselected primary color and, yellow or red is used as the second selected primary color. The percentage of blue, or blue and red or yellow, in the individual's skin tone is then used to coordinate the color of the wearing apparel and accessory items.

The color filters used in the invention comprise a plurality of filters having predetermined concentrations of the primary colors and a series of identifying indicia which permits the user to simply determine the percentage of blue, or blue and yellow or red in the individual's skin tones.

BRIEF DESCRIPTION OF THE DRAWINGS

The invention will be described by reference to the FIGURE which illustrates the color filters used in the system.

DESCRIPTION OF PREFERRED EMBODIMENTS

This invention comprises a system for coordination of the colors of an individual's wardrobe and in particular to a method of matching colors to the natural skin color tones of an individual. The method employs a spectrographic color analysis of the individual's natural skin tones and for this purpose, preferably, employs a series of colored filters.

After completing the color selection, as described in the following paragraphs, the individual can be provided with an assembly or portfolio of a plurality of swatches of fabrics of the selected colors and tones, which can then be used in selectin of clothing.

The color filters which are employed in the preferred embodiment are illustrated in the FIGURE. As there illustrated, the filters are assembled in a convenient pocket case generally indicated at 10, similar in shape and size to a billfold. The case 10 has an outer cover 12 which folds along a crease line 14 at its mid-point. One inside face 16 of the case 10 has imprinted thereon a tabulated set of indicia which will be referred to hereinafter as the Table. The opposite inside face 18 of the case 10 has a clear white surface. A plurality of color filters, 20–34 are assembled in pivotal engagement to the inside, white face 18 of case 10 by a single fastener such as rivet 36 located in one of the corners of the assembly. The filters 20–34 are filters of the primary colors in half, single and double strengths. Preferably, eight filters are used and each filter has indicia such as the colored dots 40 and 42 which appear on filter 26 in the illustration. The numbered elements of the drawings, filter colors, strengths and indicia are indicated in the following Table:

TABLE I

| Element No. | Color | Strength | Indicia |
| --- | --- | --- | --- |
| 20 | Red | Double | 2 red dots |
| 22 | Yellow | Double | 2 yellow dots |
| 24 | Red | Single | 1 red dot |
| 26 | Yellow | Single | 1 yellow dot |
| 28 | Red | Half | ½ red dot |
| 30 | Yellow | Half | ½ yellow dot |
| 32 | Cyan | Single | ¼ yellow, ¾ blue dot |
| 34 | Cyan | Half | ⅛ yellow, ⅜ blue dot |

Because of the low percentages of blue in skin tones, cyan which represents a mixture of three parts blue and 1 part yellow, is used as the blue filter, thereby permitting use of single and double strength filters of the other two primary colors. The filters are used by holding the white card 18 close to the skin of the individual and then stacking any number of the filters 20–34 into an array which, when viewed against the white background, most closely matches the skin tones of the individual. The unused filters are simply pivoted to one side, away from the inside, white face 18 and, when the color matcher achieves a close match of the skin tones, the total number of dots such as 40 and 42 are counted.

Thereafter the color matcher counts the number of blue dots such as ⅛, ⅜, or ¾, depending upon whether the half strength cyan card 34, single strength cyan card 32, or both are used in the stacked array of filters which most closely matches the individual's skin.

Armed with the information on total dots and total number of blue dots, the color matcher then determines the percentage of blue in the stacked array of filters. Although this is a simple mathematical calculation, it can be readily determined by the Table which appears on the inside face 16 of case 10. The same procedure is also used to determine the amount of red and yellow. The Table is reproduced as Table II following:

TABLE II

SPECTRANALYSIS
Units

|   | 2 | 3 | 4 | 5 | 6 | 7 | 8 |
|---|---|---|---|---|---|---|---|
|   |   |   |   | % |   |   |   |
|   | 50 | 33 | 25 | 20 | 17 | 14 | 12½ |
| ¼ | 12 | 8 | 6 | 5 | 4 | 3 | 3 |
| ½ | 25 | 17 | 12 | 10 | 8 | 7 | 6 |
| ¾ | 37 | 25 | 18 | 15 | 12 | 10 | 9 |
| 1 | 50 | 33 | 25 | 20 | 17 | 14 | 12 |
| 1¼ | 62 | 41 | 31 | 25 | 21 | 17 | 15 |
| 1½ | 75 | 50 | 37 | 30 | 25 | 21 | 18 |
| 1¾ | 87 | 58 | 43 | 35 | 29 | 24 | 21 |
| 2 | 100 | 66 | 50 | 40 | 34 | 28 | 25 |
| 2¼ |   | 74 | 56 | 45 | 38 | 31 | 28 |
| 2½ |   | 83 | 62 | 50 | 42 | 35 | 31 |
| 2¾ |   | 91 | 68 | 55 | 46 | 38 | 34 |
| 3 |   | 100 | 75 | 60 | 50 | 42 | 37 |
| 3¼ |   |   | 81 | 65 | 54 | 46 | 40 |

To illustrate use of the Table II, if the color matcher used a single strength cyan filter with the double yellow and single red filter, the concentration of blue would be ¾ part in a total of 4 parts or 18%, a value which is readily read from the Table. The color matcher would also determine that the concentration of yellow would be 2 ¼ parts in 4 parts or 56%.

The color matcher uses the information of the concentration of blue in the natural skin color to select the family of color tones which will closely match the natural skin tones of the individual and will thus flatter rather than clash with the individual's skin tones. The following general classes of color tones are used in making this determination:

TABLE III

| Tone | Blue Concentration |
|---|---|
| Warm | 0–13% |
| Cross-over | 14–18% |
| Cool | 19% and above |

Thus in the illustration, the individual has a cross-over skin tone closely bordering on the cool tones.

The skin color tone determination is used to select the primary clothing color from the cool, warm and cross-over shades. Thus, if the skin color is determined to be cool, the reds, pinks, purples and yellows of the wardrobe should have an undertone of blue, such as burgundy, magenta, mauve, bluish purple and lemon yellow, pure, or true whites are also selected. If the skin color is determined as warm, the reds, yellows, pinks and purples are selected to have yellow undertones or alterations of the primary color. Examples of these are rust, tomato, peach, pure or grayed purple and prue yellow, or gold. Suitable whites are ivory tones. If the skin is determined to be a cross-over color, the reds, yellows, pinks and purples should be altered with black or with white. Examples of these colors are garnet red, true pink, dark red violet, dubarry, and pure yellow. Suitable whites are off-white tones.

The blue and green color groups are selected by reference to the individual's eyes. In this selection care is taken so that the blue coloration of the eyes is matched exactly as possible. The exact matching is not as critical with green eyes as with blue eyes. When the individual has brown eyes, the eye color is analyzed to determine if the eye color is cool (red brown) or warm (yellow brown) and then, cool or warm tones of blues and greens are selected to match the eye color temperature.

The system of color analysis of this invention is the only one to provide wearing apparel color matching in which the neutrals are matched to an individual's hair; the blues and greens are matched to the individual's eyes by color for blue and green-eyed people and by warmth of color for brown eyes; and the reds, yellows, pinks, purples and whites are chosen according to the skin color. In practicing this method, the subjective evaluation of the skin color tones is avoided by use of precise spectranalysis using the color filters of the invention.

The invention as thus described provides the advantage of a scientific color spectranalysis and use of the analysis in selecting the proper tones of each color to be used in an individual's wardrobe described with reference to the illustrated and presently preferred embodiment. It is not intended that the invention be unduly limited by this disclosure of this presently preferred embodiment. Instead, it is intended that the invention be defined by the method steps, and means, and their equivalents set forth in the following claims.

What is claimed is:

1. The method of coordinating the colors of an individual's wardrobe which comprises:
    (a) color-spectrum analyzing the skin tones of an individual to determine the distribution and concentration of at least one preselected primary color of the colors in the individual's skin;
    (b) categorizing the colors of wearing apparel and accessories into at least two classes of color tones based on the concentration of the preselected primary color in these colors; and
    (c) selecting the class of wearing apparel and accessories for the individual having the concentration of the preselected color tones most closely matching the concentration of that preselected primary color in the individual's skin.

2. The method of claim 1 wherein said color-spectrum analysis is performed by the selection of a combination of color filters from a predetermined array of color filters calibrated in intensity of the preselected primary color.

3. The method of claim 2 wherein said preselected primary color is blue.

4. The method of claim 3 wherein wearing apparel and accessories are categorized into classes of: (a) warm, (b) cross-over, and (c) cool tones with increasing concentrations of blue, or blue with red.

5. The method of claim 4 including assembling a plurality of swatches of fabrics of colors of each of the aforesaid classes and providing the individual with the assembly of the class selected for the individual.

6. The method of claim 5 including the step of providing the individual with a portfolio of swatches of fabrics for a plurality of major garments with all swatches being of color tones of the preselected class.

7. A color filter assembly useful for the determination of the concentration of a preselected primary color in an individual's skin, which comprises:
   (a) a plurality of transparent sheets, one each of a preselected and calibrated half, full and double intensity of the primary colors of red and yellow and one each of a proportional and lower intensities of the primary blue color;
   (b) means retaining said transparent sheets in a unitary assembly with a pure white backing, while permitting superimposing one or more of said sheets over said pure white backing to provide any of a plurality of combinations of two or more of said sheets;
   (c) indicia, associated with each of said transparent sheets to provide identification of the intensity of the primary color in each sheet; and
   (d) coacting indicia indicating the percentage of one or more of the primary colors in each combination of said sheets.

8. The color filter assembly of claim 7 wherein said filters are polygonal and are assembled with a single fastener extending through commonly aligned corners thereof to said backing.

9. The color filter assembly of claim 8 wherein the indicia associated with each of said filters is one of a plurality of half, single and double dots of the primary colors.

10. The color filter assembly of claim 9 wherein said filters are assembled to a backing having a center folding crease to provide front and back covers and said filters are secured to one of said covers.

11. The method of claim 1 including the step of matching the shades of neutral colors to the individual's hair.

12. The method of claim 1 including the step of matching the shades of blues and greens to color, warmth and intensity of the individual's eye color.

13. The method of coordinating the colors of an individual's wardrobe which comprises:
   (a) color-spectrum analyzing the skin tones of an individual to determine the distribution and concentration of blue and yellow, or blue and red, in the individual's skin, and thereby classifying the individual's skin tones as being of a cool, warm or cross-over shade;
   (b) categorizing the colors of wearing apparel and accessories into: (1) cool shades having an undertone of blue, (2) warm shades having undertones of yellow or red, and (3) cross-over shades altered with black or white; and
   (c) selecting the class of wearing apparel and accessories for the individual corresponding to the aforesaid color tone shades selected in step (a).

14. The method of claim 13 wherein the step of color-spectrum analyzing is performed by placing a combinations of a plurality of color filters close to the individual's skin and selecting the combination most closely approximating the skin tones of the individual.

15. The method of claim 13 wherein the distribution and concentration of blue and yellow in the individual's skin tones is determined in step (a).

16. The method of claim 15 wherein the distribution and concentration of blue and red in the individual's skin tones is determined in step (a).

* * * * *